Feb. 21, 1933.    H. L. SMITH    1,898,982
DYNAMO ELECTRIC MACHINE
Filed March 28, 1931

Inventor:
Harold L. Smith,
By Edwin B. H. Tower Jr.
Attorney

Patented Feb. 21, 1933

1,898,982

UNITED STATES PATENT OFFICE

HAROLD L. SMITH, OF MILWAUKEE, WISCONSIN, ASSIGNOR TO THE LOUIS ALLIS COMPANY, OF MILWAUKEE, WISCONSIN, A CORPORATION OF WISCONSIN

DYNAMO-ELECTRIC MACHINE

Application filed March 28, 1931. Serial No. 526,054.

The invention relates to dynamo electric machines.

The dynamo electric machine in which the present invention is employed is a modification of the invention described and claimed in co-pending application Serial No. 361,767 filed by the same applicant May 9, 1929 and issuing into Patent No. 1,799,071 upon March 31, 1931.

The invention has as its object to provide a dynamo electric machine which is simple and compact and which may be readily manufactured.

Another object is to provide a simple and efficient stator to which a removable end plate may be readily fastened upon each end thereof.

Another object is to facilitate providing the stator with a closed inner casing and an open outer casing.

According to the present invention, the stator is provided with an end ring arranged upon each end of its core and having an axial or lateral flange to form in part an outer casing to provide a passage for external air over the core, and a removable end plate is fastened to each end ring.

The dynamo electric machine which is hereinafter described and shown in the accompanying drawing is an induction motor in which the invention is embodied.

The views in the drawing are as follows:—

Figure 1:
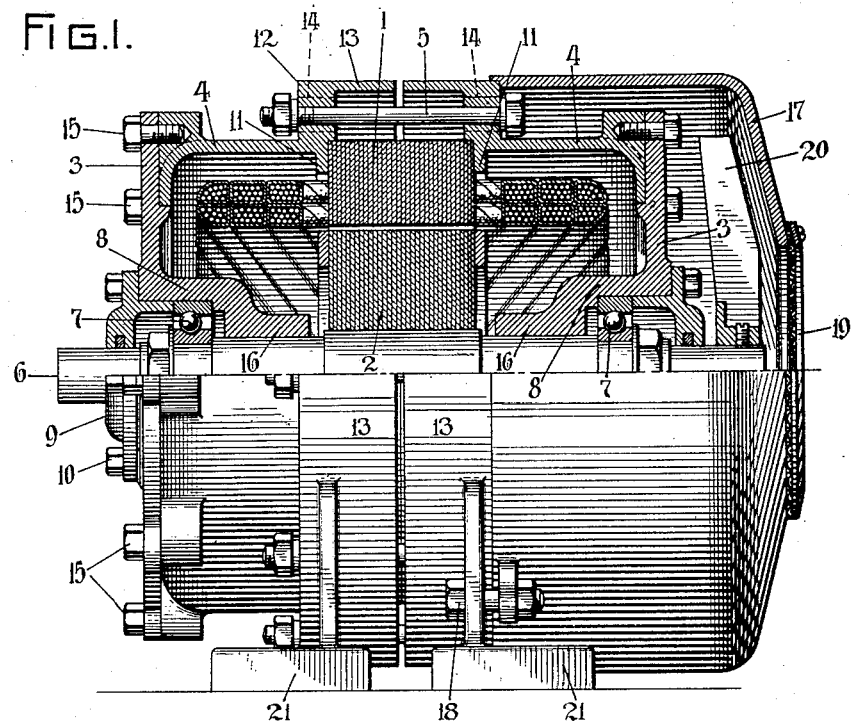
Fig. 1 is a front sectional view of the motor.
Figure 2:
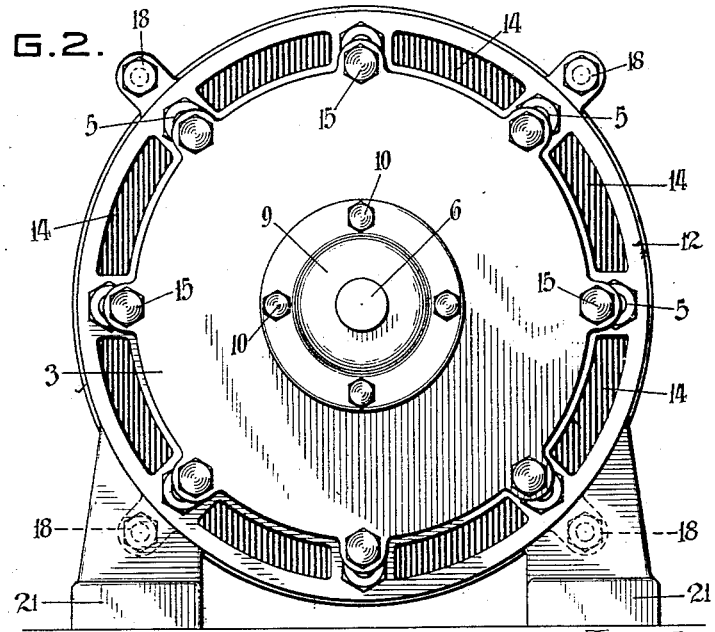
Fig. 2 is an end view thereof.

The motor is provided with a stator having a laminated core 1 carrying a primary winding and a rotor having a laminated core 2 arranged within the stator core and carrying a secondary winding.

The stator has arranged upon each end thereof a removable closed end plate 3 to form therewith a closed inner casing having sufficient strength to resist and confine a gaseous explosion within its interior.

The stator has an end ring 4 arranged upon each end of its core and connected to each other by bolts 5 to bind the laminations of the core together.

The rotor core is arranged within the stator core upon a rotor shaft 6 carried by ball bearings 7, one of which is arranged in each end plate.

The ball bearing is arranged within a socket 8 formed in the end plate, and it is held therein by a removable cap 9 fastened to the end plate by bolts 10.

The end plate has a continuous inward flange 11 in engagement with the end of the stator core and an outward flange 12 which extends beyond the outside of the core and carries a peripheral flange 13.

The inward flange 11 forms with the stator core an elongated joint having sufficient length to quench ignited or exploded gas from within the inner casing before it reaches the outside thereof.

The two flanges 12 form an outer casing surrounding the stator core for the passage of external air thereover, and the core dissipates its heat by direct metallic conduction to the air passing through the outer casing.

The bolts 5, which fasten the end rings together, pass through the flanges 12 intermediate openings 14 which are formed therein for the passage of air into and out of the outer casing.

The end plate is fastened to the end of its adjoining end ring by bolts 15, and it forms with the end plate an elongated joint having sufficient length to quench ignited or exploded gas from within the inner casing before it reaches the outside thereof.

The end plate has formed thereon apart from the bearing for the shaft a central sleeve 16 extending over and around the shaft to form an elongated joint between the end plate and the shaft.

The elongated joint thus formed between the end plate and the shaft has sufficient length to quench ignited or exploded gas from within the inner casing before it reaches the outside thereof.

One of the outward flanges 12 carries an end casing 17 which communicates with the openings 14 formed therein and is secured in position by bolts 18.

The end casing is provided with a central inlet opening 19 to admit external air thereto.

The shaft 6 carries upon one end thereof a fan 20 which is arranged within the end casing to circulate external air over the inner casing.

The fan 20 causes air admitted to the end casing through the inlet 19 to pass through the outer casing to absorb heat from the stator core.

The stator is supported in any suitable manner as by legs 21 carried by the outer casing.

The motor which has been described has high capacity and efficiency for a given size core and given over-all dimensions, even though it is enclosed within a closed inner casing, as its core dissipates its heat at a high rate by direct metallic conduction to external air.

The invention herein set forth is susceptible of various modifications within the scope of the appended claims.

The invention which has been shown and described is hereby claimed as follows:

1. A dynamo electric machine, comprising a stator provided with a laminated core having its outside exposed to external air and an end ring arranged upon each end thereof to bind its laminations together, a closed end plate arranged upon each end ring and forming therewith and with said core a closed inner casing, a rotor arranged within said stator and having its shaft bearing in said end plates, flanges carried by said end rings and forming an outer casing to provide a passage for external air over said core, and means to cause external air to flow through said outer casing.

2. A dynamo electric machine, comprising a stator provided with a laminated core having its outside exposed to external air and an end ring arranged upon each end thereof to bind its laminations together, a closed end plate arranged upon each end ring and forming therewith and with said core a closed inner casing, a rotor arranged within said stator and having its shaft bearing in said end plates, an outer casing constituted by a flange formed integral with each of said end rings to provide a passage for external air over said core, and means to cause external air to flow through said outer casing.

3. A dynamo electric machine, comprising a stator provided with a laminated core having its outside exposed to external air and an end ring arranged upon each end thereof to bind its laminations together, a closed end plate arranged upon each end ring and forming therewith and with said core a closed inner casing, a rotor arranged within said stator and having its shaft bearing in said end plates, an apertured outward flange carried by each end ring, a peripheral flange arranged upon the outer edge of each outward flange and forming with each other an outer casing to provide a passage for external air over said core, and means to cause external air to flow through said outer casing.

4. A dynamo electric machine, comprising a stator provided with a laminated core having its outside exposed to external air and an end ring arranged upon each end thereof to bind its laminations together, a closed end plate arranged upon each end ring and forming therewith and with said core a closed inner casing, a rotor arranged within said stator and having its shaft bearing in said end plates, flanges carried by said end rings and forming an outer casing to provide a passage for external air over said core, an end casing arranged upon one end of said outer casing and spaced from said inner casing, and a fan arranged in said end casing and carried by said shaft to cause external air to flow through said end casing and through said outer casing in direct contact with said core.

5. A dynamo electric machine, comprising a stator provided with a laminated core having its outside exposed to external air and an end ring arranged upon each end thereof to bind its laminations together, a closed end plate arranged upon each end ring and forming therewith and with said core a closed inner casing, a rotor arranged within said stator and having its shaft bearing in said end plates, an outer casing constituted by a flange formed integral with each of said end rings to provide a passage for external air over said core, an end casing arranged upon one end of said outer casing and spaced from said inner casing, and a fan arranged in said end casing and carried by said shaft to cause external air to flow through said end casing and through said outer casing in direct contact with said core.

6. A dynamo electric machine, comprising a stator provided with a laminated core having its outside exposed to external air and an end ring arranged upon each end thereof to bind its laminations together, a closed end plate arranged upon each end ring and forming therewith and with said core a closed inner casing having between each end ring and its adjoining end plate an elongated joint of sufficient length to quench ignited or exploded gas from the interior of said inner casing before it reaches the outside thereof, a rotor arranged within said stator and having its shaft bearing in said end plates, an elongated sleeve arranged upon each end plate around said shaft and forming between said shaft and said end plate an elongated joint having sufficient length to quench ignited or exploded gas from within said inner casing before it reaches the outside thereof, an outer casing constituted by a flange formed integral with each of said end rings, to provide a passage for external air over said core, and means to cause external air to flow through said outer casing.

7. A dynamo electric machine, comprising a stator provided with a laminated core having its outside exposed to external air and an end ring arranged upon each end thereof to bind its laminations together, a closed end plate arranged upon each end ring and forming therewith and with said core a closed inner casing having between each end ring and its adjoining end plate an elongated joint of sufficient length to quench ignited or exploded gas from the interior of said inner casing before it reaches the outside thereof, a rotor arranged within said stator and having its shaft bearing in said end plates, an elongated sleeve arranged upon each end plate around said shaft and forming between said shaft and said end plate an elongated joint having sufficient length to quench ignited or exploded gas from within said inner casing before it reaches the outside thereof, an apertured outward flange carried by each end ring, a peripheral flange arranged upon the outer edge of each outward flange and forming with each other an outer casing to provide a passage for external air over said core, and means to cause external air to flow through said outer casing.

8. A dynamo electric machine, comprising a stator provided with a laminated core having its outside exposed to external air and an end ring arranged upon each end thereof to bind its laminations together, a closed end plate arranged upon each end ring and forming therewith and with said core a closed inner casing having between each end ring and its adjoining end plate an elongated joint of sufficient length to quench ignited or exploded gas from the interior of said inner casing before it reaches the outside thereof, a rotor arranged within said stator and having its shaft bearing in said end plates, an elongated sleeve arranged upon each end plate around said shaft and forming between said shaft and said end plate an elongated joint having sufficient length to quench ignited or exploded gas from within said inner casing before it reaches the outside thereof, flanges carried by said end rings and forming an outer casing to provide a passage for external air over said core, an end casing arranged upon one end of said outer casing and spaced from said inner casing, and a fan arranged in said end casing and carried by said shaft to cause external air to flow through said end casing and through said outer casing in direct contact with said core.

9. A dynamo electric machine, comprising a stator provided with a laminated core having its outside exposed to external air and an end ring arranged upon each end thereof to bind its laminations together, a closed end plate arranged upon each end ring and forming therewith and with said core a closed inner casing having between each end ring and said core and between each end ring and its adjoining end plate an elongated joint of sufficient length to quench ignited or exploded gas from the interior of said inner casing before it reaches the outside thereof, a rotor arranged within said stator and having its shaft bearing in said end plates, an elongated sleeve arranged upon each end plate around said shaft and forming between said shaft and said end plate an elongated joint having sufficient length to quench ignited or exploded gas from within said inner casing before it reaches the outside thereof, an apertured outward flange carried by each end ring, a peripheral flange arranged upon the outer edge of each outward flange and forming with each other an outer casing to provide a passage for external air over said core, and means to cause external air to flow through said outer casing.

10. A dynamo electric machine, comprising a stator provided with a laminated core having its outside exposed to external air and an end ring arranged upon each end thereof to bind its laminations together, a closed end plate arranged upon each end ring and forming therewith and with said core a closed inner casing having between each end ring and said core and between each end ring and its adjoining end plate an elongated joint of sufficient length to quench ignited or exploded gas from the interior of said inner casing before it reaches the outside thereof, a rotor arranged within said stator and having its shaft bearing in said end plates, an elongated sleeve arranged upon each end plate around said shaft and forming between said shaft and said end plate an elongated joint having sufficient length to quench ignited or exploded gas from within said inner casing before it reaches the outside thereof, flanges carried by said end rings and forming an outer casing to provide a passage for external air over said core, an end casing arranged upon one end of said outer casing and spaced from said inner casing, and a fan arranged in said end casing and carried by said shaft to force external air through said end casing and through said outer casing in direct contact with said core.

11. A dynamo electric machine, comprising a stator provided with a laminated core, an end ring arranged upon each end of said core and connected to each other to clamp said core therebetween, an end plate arranged upon each end of said stator and forming therewith a closed inner casing having sufficient strength to resist a gaseous explosion within its interior, a rotor arranged within said stator and having a shaft bearing in each end plate, an open outer casing formed integral with each end ring and extending over and around said core to form with each other a ventilating passage for external air thereover, an end casing arranged around one end of said inner casing and supported by said outer casing upon one end thereof, and a fan arranged within said end casing and driven by said shaft to cause air to flow through said outer casing in direct contact with said core.

12. A dynamo electric machine, comprising a stator provided with a laminated core, a cylindrical end ring arranged upon each end of said stator core and extending beyond the stator winding, means connecting said end rings to each other to clamp said core therebetween, an end plate arranged upon each end of said stator and forming therewith a closed inner casing, a rotor arranged within said stator and having a shaft bearing in each end plate, an outer casing formed by a shell upon each end ring integral therewith and extending over and around said core, an end casing enclosing one end of said inner casing and communicating with said outer casing, and a fan arranged within said end casing and driven by said shaft to cause external air to flow through said outer casing to absorb heat from said core.

In witness whereof, I have hereunto subscribed my name.

HAROLD L. SMITH.